United States Patent
Zhang et al.

(10) Patent No.: US 9,836,640 B2
(45) Date of Patent: Dec. 5, 2017

(54) FACE DETECTOR TRAINING METHOD, FACE DETECTION METHOD, AND APPARATUSES

(71) Applicant: Huawei Technologies Co., Ltd., Shenzhen (CN)

(72) Inventors: Yu Zhang, Shenzhen (CN); Zhenhua Chai, Beijing (CN); Zhijun Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 14/623,106

(22) Filed: Feb. 16, 2015

(65) Prior Publication Data

US 2015/0235074 A1 Aug. 20, 2015

(30) Foreign Application Priority Data

Feb. 17, 2014 (CN) .......................... 2014 1 0053378

(51) Int. Cl.
*G06K 9/00* (2006.01)
*G06N 99/00* (2010.01)

(52) U.S. Cl.
CPC ....... *G06K 9/00288* (2013.01); *G06N 99/005* (2013.01)

(58) Field of Classification Search
CPC .................. G06K 9/00288; G06K 9/00228
See application file for complete search history.

(56) References Cited

U.S. PATENT DOCUMENTS

| | | | |
|---|---|---|---|
| 9,430,697 B1* | 8/2016 | Iliadis | ............... G06K 9/00288 |
| 2003/0110147 A1* | 6/2003 | Li | ...................... G06K 9/00228 |
| | | | 706/1 |
| 2009/0190803 A1* | 7/2009 | Neghina | ............... H04N 5/232 |
| | | | 382/118 |
| 2012/0328199 A1 | 12/2012 | Woo et al. | |

(Continued)

FOREIGN PATENT DOCUMENTS

| | | |
|---|---|---|
| CN | 102592147 A | 7/2012 |
| EP | 1596323 A1 | 11/2005 |

OTHER PUBLICATIONS

Liao, S., "Structured Ordinal Features for Appearance-Based Object Representation," AMFG, LNCS 4778, Oct. 20, 2007, pp. 183-192.

(Continued)

*Primary Examiner* — Wesley Tucker
(74) *Attorney, Agent, or Firm* — Conley Rose, P.C.

(57) ABSTRACT

A face detector training method, a face detection method, and apparatuses are provided. In the present invention, during a training phase, a flexible block based local binary pattern feature and a corresponding second classifier are constructed, appropriate second classifiers are searched for to generate multiple first classifiers, and multiple layers of first classifiers that are obtained by using a cascading method form a final face detector; and during a detection phase, face detection is performed on a to-be-detected image by using a first classifier or a face detector that is learned during a training process, so that a face is differentiated from a non-face, and a face detection result is combined and output.

16 Claims, 7 Drawing Sheets

---

Collect face and non-face images as a training sample set, and extract an FBLBP feature of the face and non-face images to form an FBLBP feature set — Step 1

Use the FBLBP feature and the GentleBoost algorithm to perform training, to obtain a first classifier, where the first classifier includes several optimal second classifiers, and each optimal second classifier is obtained by training by using the GentleBoost algorithm — Step 2

Repeat a training process in the step 1 to the step 2 to obtain multiple layers of first classifiers, and cascade the multiple layers of the first classifiers to form a face detector — Step 3

(56) References Cited

U.S. PATENT DOCUMENTS

| | | | |
|---|---|---|---|
| 2014/0003728 A1* | 1/2014 | Aoki | G06K 9/00228 |
| | | | 382/218 |
| 2014/0314273 A1* | 10/2014 | Muninder | G06K 9/6232 |
| | | | 382/103 |
| 2015/0055834 A1* | 2/2015 | Zou | G06K 9/00281 |
| | | | 382/118 |

OTHER PUBLICATIONS

Foreign Communication From A Counterpart Application, European Application No. 15154873.2, Extended European Search Report dated Oct. 16, 2015, 6 pages.
Machine Translation and Abstract of Chinese Publication No. CN102592147, Jul. 18, 2012, 32 pages.
Zhang, L., et al., "Face Detection Based on Multi-Block LBP Representation," ICB 2007: Advances in Biometrics, 2007, pp. 11-18.
Qiong, H., et al., "Fast Face Detection Method Based on Cascade Classifiers," Dec. 31, 2007, pp. 1100-1105.
English Translation of Qiong, H., et al., "Fast Face Detection Method Based on Cascade Classifiers," Dec. 31, 2007, 9 pages.
Chai, Z., et al., "Local Salient Patterns—a Novel Local Descriptor for Face Recognition," International Conference on Biometrics, Jun. 4-7, 2013, 6 pages.
Foreign Communication From a Counterpart Application, Chinese Application No. 201410053378.8, Chinese Office Action dated Sep. 25, 2017, 7 pages.

\* cited by examiner

FACE DETECTOR TRAINING METHOD, FACE DETECTION METHOD, AND APPARATUSES

CROSS-REFERENCE TO RELATED APPLICATION

This application claims priority to Chinese Patent Application No. 201410053378.8, filed on Feb. 17, 2014, which is hereby incorporated by reference in its entirety.

TECHNICAL FIELD

Embodiments of the present invention relate to the image mode identification technologies, and in particular, to a face detector training method, a face detection method, and apparatuses.

BACKGROUND

A face detection technology refers to a process of determining whether a face is included in an image or a video and determining a face position and a scale. A precondition for implementing face detection is to construct a face detector. Generally, a face detector is constructed by using the following manners in the prior art.

Technology 1: A Haar-Like feature and an Adaboost algorithm are used to implement face detection. In this method, the Haar-Like feature is used to represent a face, training is performed on each Haar-Like feature to obtain a weak classifier, multiple weak classifiers that can most represent a face are selected by using the Adaboost algorithm to construct a strong classifier, and several strong classifiers are connected in series to form a cascading classifier of a cascading structure, that is, a face detector. In this technology, only face image information of a pivot block and one neighbor block is considered in each Haar-Like feature. As a result, the number of Haar-Like features is large, an identification capability is weak, a large number of weak classifiers generally need to be trained, an overall identification capability is weak, and eventually a face detection rate is low.

Technology 2: A multi-scale block local binary pattern (MBLBP) feature and the Adaboost algorithm are used to implement face detection. This method is based on Technology 1. An MBLBP feature of face image information of a pivot block and 8 neighbor blocks is used to represent a face. The MBLBP feature is calculated by comparing average grayscale of the pivot block with average grayscale of each of the 8 peripheral neighbor blocks. Details are shown in FIG. 1. FIG. 1 is a schematic diagram of an MBLBM feature in the prior art. In this technology, it is required that the 8 neighbor blocks must be evenly distributed around the pivot block, and the pivot block must be adjacent to each of the neighbor block. A reference value for comparison is fixed as 0 when an average grayscale value of a training sample is calculated. As a result, robustness of an MBLBP feature to noise is poor, a false detection rate of face detection is high, and user experience of face detection is poor.

Technology 3: A multi-scale structured ordinal feature (MSOF) and the Adaboost algorithm are used to implement face detection. This method is based on Technology 2. An MSOF feature of face image information of a pivot block and 8 neighbor blocks is used to represent a face. A distance of the 8 neighbor blocks relative to the pivot block is adjustable, and the pivot block may not be adjacent to the 8 neighbor blocks. Details are shown in FIG. 2. FIG. 2 is a schematic diagram of an MSOF feature in the prior art. In this technology, it is required that space positions of the 8 neighbor block relative to the pivot block are evenly distributed. Flexibility is poor, robustness is restricted to a certain extent, and a false detection rate of a face detector is high.

SUMMARY

Embodiments of the present invention provide a face detector training method, a face detection method, and apparatuses, to construct a high-precision face detector by using a flexible block based local binary pattern feature and the GentleBoost algorithm, so as to improve precision of face detection.

According to a first aspect, an embodiment of the present invention provides a face detection training method, including the following steps.

Step 1: Collecting face and non-face images as a training sample set, and extracting an FBLBP feature of the face and non-face images to form an FBLBP feature set.

Step 2: Using the FBLBP feature and the GentleBoost algorithm to perform training, to obtain a first classifier, where the first classifier includes several optimal second classifiers, and each optimal second classifier is obtained by training by using the GentleBoost algorithm.

Step 3: Repeating a training process from the step 1 to the step 2 to obtain multiple layers of first classifiers, and cascading the multiple layers of first classifiers to form a face detector.

In a first possible implementation manner of the first aspect, the step 1 includes the following substeps.

Step 1.1: Constructing the FBLBP feature to represent co-occurrence information of a relative change of local grayscale of an image, where the FBLBP feature includes several congruent rectangular blocks, a threshold, and a sign bit, where the several congruent rectangular blocks include one pivot block and at least one neighbor block; and when the sign bit is 1, the threshold is $\theta_0$, and when the sign bit is 1, the threshold is $\theta_1$, where $\theta_0$ and $\theta_1$ are real numbers.

Step 1.2: Calculating a sketch value $AvgInt_{pivotblock}$ of the pivot block in the FBLBP feature and a sketch value $AvgInt_{neighborblock_k}$ of each of the neighbor blocks in the FBLBP feature, where the sketch value $AvgInt_{pivotblock}$ of the pivot block is represented by average grayscale of an area in which the pivot block is located, the sketch value $AvgInt_{neighborblock_k}$ of each of the neighbor blocks is represented by average grayscale of each area in which each of the neighbor blocks is located separately, and k is a sequence number of the $k^{th}$ neighbor block, where for each of the neighbor blocks, calculating a differential result according to the sign bit, and comparing and quantizing the differential result and the threshold; and converting a binary number that consists of a quantization result of each of the neighbor blocks into a decimal number, and saving the decimal number to obtain a sketch value of the FBLBP feature.

With reference to the first aspect or the first possible implementation manner of the first aspect, in a second possible implementation manner of the first aspect, in the step 2 of using the FBLBP feature and the GentleBoost algorithm to perform training, to obtain a first classifier, where the first classifier consists of several optimal second classifiers, and each optimal second classifier is obtained by training by using the GentleBoost algorithm, a calculation formula (1) of a second classifier is as follows:

$$f_m(x) = \begin{cases} a_0, & x = 0 \\ a_1, & x = 1 \\ \ldots \\ a_{2^K-1}, & x = 2^K - 1 \end{cases};$$

where, $f_m(x)$ is the $m^{th}$ second classifier, x is a sketch value of an FBLBP feature of the second classifier, K is the number of neighbor blocks of the FBLBP feature, and $a_j$ is output of a second classifier, where $a_j$ is calculated according to a formula (2):

$$a_j = \frac{\sum_i w_i y_i \delta(x_i = j)}{\sum_i w_i \delta(x_i = j)};$$

where, $0 \leq j \leq 2^K-1$ and j is an integer; $y_i$ is a class of the $i^{th}$ training sample, where when the training sample is a face image, a value of $y_i$ is 1, and when the training sample is not a face image, the value of $y_i$ is −1; $\delta(\ )$ is a Kronecker function, where if $x_i=j$ is true, output is 1, and if $x_i=j$ is false, output is 0; i is the $i^{th}$ training image sample; and $\omega_i$ is weight of the $i^{th}$ training image sample.

With reference to the second possible implementation manner of the first aspect, in a third possible implementation manner of the first aspect, the method further includes obtaining, by calculation, the weight $\omega_i$ of the $i^{th}$ training image sample according to a formula (3) and a normalization formula (4), where, the formula (3) is $\omega_i = \omega_i \times e^{-y_i f_m(x_i)}$; and the formula (4) is $$\omega_i = \frac{\omega_i}{\sum_i \omega_i}.$$

With reference to the second possible implementation manner of the first aspect, in a fourth possible implementation manner of the first aspect, the method further includes obtaining, by calculation, a sketch value x of an FBLBP feature of each second classifier in the formula (1) according to a formula (5), where, the formula (5) is as follows:

$$x = \sum_{k=1}^{K} 2^{k-1} FBLBP_{sign,k},$$

where K is the number of neighbor blocks,
if sign=1, $FBLBP_{sign,k}=\delta((AvgInt_{pivotblock}-AvgInt_{neighborblock_k}) \leq \theta_1)$; and
if sign=−1, $FBLBP_{sign,k}=\delta((AvgInt_{pivotblock}-AvgInt_{neighborblock_k}) \leq \theta_0)$;
where $\delta(\ )$ is a Kronecker function, where when input is true, output is 1; otherwise, when input is false, output is 0.

With reference to the first aspect or the first possible implementation manner of the first aspect, in a fifth possible implementation manner of the first aspect, in the step 2 of using the FBLBP feature and the GentleBoost algorithm to perform training so as to obtain a first classifier, where the first classifier consists of several optimal second classifiers, a process of calculating the optimal second classifiers includes the following substeps.

Step 2.1: Initially, the FBLBP feature includes only one pivot block and one neighbor block, where an FBLBP feature set of the FBLBP feature that consists of the two rectangular blocks may be obtained by using Brute force and traversal; for each FBLBP feature in the FBLBP feature set, calculating a sketch value of the FBLBP feature and an output value of a corresponding second classifier; substituting the obtained output value of the second classifier into a formula (6) to obtain an error J of the second classifier; and selecting a second classifier having a smallest value of the error J as the optimal second classifier, where the formula (6) is as follows:

$$J = \sum_{i=1}^{N} w_i(y_i - f_m(x_i))^2;$$

where, J is an optimized objective function, that is, a weighted classification error, and N is the total number of training samples.

Step 2.2: After the FBLBP feature that includes only one pivot block and one neighbor block is determined according to the step 2.1, increasing the number of neighbor blocks for the FBLBP feature by traversing rectangular blocks, in an image, that have a same size as the pivot block; calculating a value x by substituting the sketch value of the FBLBP feature into a formula (5); calculating the error J by substituting the value x into the formula (6); if J further decreases, incorporating a new neighbor block into a current optimal second classifier; if J does not decrease, stopping incorporation, directly outputting the current feature, and meanwhile updating weight and entering a next GentleBoost cycle; where a calculation formula (7) for combining an optimal second classifier of each GentleBoost cycle into the first classifier in the step 2 is as follows:

$$F(x)=F(x)+f_m(x);$$

where, F(x) is the first classifier, and F(x) is initialized to 0.

With reference to the fifth possible implementation manner of the first aspect, in a sixth possible implementation manner of the first aspect, the step 2 further includes determining a threshold of the first classifier according to a formula (8), where the formula (8) is as follows:

$$th = \mathrm{argmax}\left(\sum_{i_1 \in Face} \delta(F(x_{i_1}) \geq th) + \sum_{i_2 \in Non\text{-}face} \delta(F(x_{i_2}) < th)\right);$$

where $i_1$ is the $i_1^{th}$ training image sample that includes a face; $i_2$ is the $i_2^{th}$ training image sample that includes a non-face; and th is the threshold of the first classifier.

With reference to the first possible implementation manner of the first aspect, in a seventh possible implementation manner of the first aspect, the step 1.2 of for each of the neighbor block, calculating a differential result according to the sign bit, and comparing and quantizing the differential result and the threshold; and finally, converting a binary number that consists of a quantization result of each of the neighbor block into a decimal number, and saving the decimal number to obtain a sketch value of the FBLBP feature includes, for each neighbor block, when the sign bit is 1, if a difference between the sketch value $AvgInt_{pivotblock}$ of the pivot block and a sketch value $AvgInt_{neighborblock_k}$ of the $k^{th}$ neighbor block is not less than the threshold $\theta_1$, labeling a position of the neighbor block as 1, and otherwise, if the difference between the sketch value $\text{AvgInt}_{pivotblock}$ of the pivot block and the sketch value $\text{AvgInt}_{neighborblock_k}$ of the $k^{th}$ neighbor block is less than the threshold $\theta_1$, labeling the position of the neighbor block as 0; or, for each of the neighbor block, if an opposite number of a difference between the sketch value $\text{AvgInt}_{pivotblock}$ of the pivot block and a sketch value $\text{AvgInt}_{neighborblock_k}$ of the $k^{th}$ neighbor block is not less than the threshold $\theta_0$, labeling a position of the neighbor block as 1, and otherwise, if the opposite number of the difference between the sketch value $\text{AvgInt}_{pivotblock}$ of the pivot block and the sketch value $\text{AvgInt}_{neighborblock_k}$ of the $k^{th}$ neighbor block is less than the threshold $\theta_0$, labeling the position of the neighbor block as 0.

According to a second aspect, an embodiment of the present invention provides a method for performing face detection by using the face detector that is obtained by using the foregoing first aspect or any one of the first to the seventh possible implementation manners of the first aspect, where the method includes the following steps.

Step 4: Traversing a to-be-detected image to obtain a to-be-detected subimage set.

Step 5: Inputting each to-be-detected subimage in the to-be-detected subimage set into the face detector, and calculating, layer by layer, output of a first classifier at each layer in the face detector.

Step 6: For a to-be-detected subimage, considering that the to-be-detected subimage is a non-face if output of a first classifier at any layer of the face detector is less than a threshold that is of the first classifier and is obtained by training, where only a to-be-detected subimage that passes determining of classifiers at all layers is considered as a face.

Step 7: Combining all detection results in the step 6, and outputting a position of a face in the to-be-detected image.

In a first possible implementation manner of the second aspect, the step 4 includes the following substeps.

Step 4.1. Traversing the to-be-detected image in a detection window with a preset length-width ratio.

Step 4.2: Enlarging the detection window by the preset length-width ratio according to a preset step to traverse the to-be-detected image, and repeating this operation to traverse the to-be-detected image in a different detection window until length of the detection window is greater than or equal to length of the to-be-detected image or until width of the detection window is greater than or equal to width of the to-be-detected image.

Step 4.3: Performing normalization processing on subimages that are obtained by traversing the to-be-detected image in the step 4.1 and the step 4.2, so that a length-width ratio of each subimage conforms to the preset length-width ratio, and using a set that consists of all normalized subimages as the to-be-detected subimage set.

According to a third aspect, an embodiment of the present invention provides a face detector training apparatus, including an FBLBP feature set module configured to collect face and non-face images as a training sample set, and extract an FBLBP feature of the face and non-face images to form an FBLBP feature set; a first classifier module configured to perform training, by using the FBLBP feature that is collected by the FBLBP feature set module and by using the GentleBoost algorithm, to obtain a first classifier, where the first classifier includes several optimal second classifiers, and each optimal second classifier is obtained by training by using the GentleBoost algorithm; and a face detector module configured to repeat a training process of the FBLBP feature set module and the first classifier module to obtain multiple layers of first classifiers, and cascade the multiple layers of first classifiers to form a face detector.

In a first possible implementation manner of the third aspect, the FBLBP feature set module includes a constructing unit configured to construct the FBLBP feature to represent co-occurrence information of a relative change of local grayscale of an image, where the FBLBP feature includes several congruent rectangular blocks, a threshold, and a sign bit, where the several congruent rectangular blocks include one pivot block and at least one neighbor block; and when the sign bit is −1, the threshold is $\theta_0$, and when the sign bit is 1, the threshold is $\theta_1$, where $\theta_0$ and $\theta_1$ are real numbers; and a calculating unit configured to calculate a sketch value $\text{AvgInt}_{pivotblock}$ of the pivot block in the FBLBP feature that is constructed by the constructing unit and a sketch value $\text{AvgInt}_{neighborblock_k}$ of each of the neighbor block in the FBLBP feature that is constructed by the constructing unit, where the sketch value $\text{AvgInt}_{pivotblock}$ of the pivot block is represented by average grayscale of an area in which the pivot block is located, the sketch value $\text{AvgInt}_{neighborblock_k}$ of each of the neighbor block is represented by average grayscale of an area in which each of the neighbor block is located separately, and k is a sequence number of the $k^{th}$ neighbor block; for each of the neighbor block, calculate a differential result according to the sign bit, and compare and quantize the differential result and the threshold; and convert a binary number that consists of a quantization result of each of the neighbor block into a decimal number, and save the decimal number, to obtain a sketch value of the FBLBP feature.

With reference to the third aspect or the first possible implementation manner of the third aspect, in a second possible implementation manner of the third aspect, the first classifier module is configured to use the FBLBP feature and the GentleBoost algorithm to perform training, to obtain the first classifier, where the first classifier consists of several optimal second classifiers, and each optimal second classifier is obtained by training by using the GentleBoost algorithm, where a calculation formula (1) of a second classifier is as follows:

$$f_m(x) = \begin{cases} a_0, & x = 0 \\ a_1, & x = 1 \\ \ldots \\ a_{2^K-1}, & x = 2^K - 1 \end{cases} ;$$

where $f_m(x)$ in is the $m^{th}$ second classifier, x is a sketch value of an FBLBP feature of the second classifier, K is the number of neighbor blocks of the FBLBP feature, and $a_j$ is output of a second classifier, where $a_j$ is calculated according to a formula (2):

$$a_j = \frac{\sum_i w_i y_i \delta(x_i = j)}{\sum_i w_i \delta(x_i = j)} ;$$

where, $0 \leq h \leq 2^K - 1$ and j is an integer; $y_i$ is a class of the $i_{th}$ training sample, where when the training sample is a face image, a value of $y_i$ is 1, and when the training sample is not a face image, the value of $y_i$ is −1; $\delta(\ )$ is a Kronecker function, where if $x_i = j$ is true, output is 1, and if $x_i = j$ is false, output is 0; i is the $i^{th}$ training image sample; and $\omega_i$ is weight of the $i^{th}$ training image sample.

With reference to the second possible implementation manner of the third aspect, in a third possible implementation manner of the third aspect, the first classifier module is configured to obtain, by calculation, the weight $\omega_i$ of the $i^{th}$ training image sample according to a formula (3) and a normalization formula (4), where, the formula (3) is $\omega_i=\omega_i\times e^{-yf_m(x_i)}$; and the formula (4) is $$\omega_i = \frac{\omega_i}{\sum_i \omega_i}.$$

With reference to the second possible implementation manner of the third aspect, in a fourth possible implementation manner of the third aspect, the first classifier module is configured to obtain, by calculation, a sketch value x of an FBLBP feature of each second classifier in the formula (1) according to a formula (5), where the formula (5) is as follows:

$$x = \sum_{k=1}^{K} 2^{k-1} FBLBP_{sign,k},$$

where K is the number of neighbor blocks;
if sign=1, $FBLBP_{sign,k}=\delta((AvgInt_{pivotblock}-AvgInt_{neighborblock_k})\leq\theta_1)$; and
if sign=-1, $FBLBP_{sign,k}=\delta((AvgInt_{pivotblock}-AvgInt_{neighborblock_k})\leq\theta_0)$;
where $\delta(\ )$ is a Kronecker function, where when input is true, output is 1; otherwise, when input is false, output is 0.

With reference to the third aspect or the first possible implementation manner of the third aspect, in a fifth possible implementation manner of the third aspect, the first classifier includes an initial calculation module configured to initially, the FBLBP feature includes only one pivot block and one neighbor block, where an FBLBP feature set of the FBLBP feature that consists of the two rectangular blocks may be obtained by using Brute force and traversal; for each FBLBP feature in the FBLBP feature set, calculate a sketch value of the FBLBP feature and an output value of a corresponding second classifier; substitute the obtained output value of the second classifier into a formula (6) to obtain an error J of the second classifier; and select a second classifier having a smallest value of the error J as the optimal second classifier; where the formula (6) is as follows:

$$J = \sum_{i=1}^{N} w_i(y_i - f_m(x_i))^2;$$

where, J is an optimized objective function, that is, a weighted classification error, and N is the total number of training samples; a cyclic calculation module configured to, after the initial calculation module determines the FBLBP feature that includes only one pivot block and one neighbor block, increase the number of neighbor blocks for the FBLBP feature by traversing rectangular blocks, which have a same size as the pivot block, in an image; re-calculate a value x by substituting the sketch value of the FBLBP feature into a formula (5); calculate the error J by substituting the value x into the formula (6); if J further decreases, incorporate a new neighbor block into a current optimal second classifier; if J does not decrease, stop incorporation, directly output the current feature, and meanwhile update weight and enter a next GentleBoost cycle; and a combining module configured to combine an optimal second classifier that is obtained in each cycle by the cyclic calculation module into the first classifier according to a formula (7), where the formula (7) is as follows:

$$F(x)=F(x)+f_m(x);$$

where, F(x) is the first classifier, and F(x) is initialized to 0.

With reference to the fifth possible implementation manner of the third aspect, in a sixth possible implementation manner of the third aspect, the apparatus further includes a threshold determining module configured to determine a threshold of the first classifier according to a formula (8), where the formula (8) is as follows:

$$th = \arg\max\left(\sum_{i_1 \in Face} \delta(F(x_{i_1}) \geq th) + \sum_{i_2 \in Non\text{-}face} \delta(F(x_{i_2}) < th)\right);$$

where $i_1$ is the $i_1^{th}$ training image sample that includes a face; $i_2$ is the $i_2^{th}$ training image sample that includes a non-face; and th is the threshold of the first classifier.

With reference to the first possible implementation manner of the third aspect, in a seventh possible implementation manner of the third aspect, the calculating unit is configured to, for each neighbor block, when the sign bit is 1, if a difference between the sketch value $AvgInt_{pivotblock}$ of the pivot block and a sketch value $AvgInt_{neighborblock_k}$ of the $k^{th}$ neighbor block is not less than the threshold $\theta_1$, label a position of the neighbor block as 1, and otherwise, if the difference between the sketch value $AvgInt_{pivotblock}$ of the pivot block and the sketch value $AvgInt_{neighborblock_k}$ of the $k^{th}$ neighbor block is less than the threshold $\theta_1$, label the position of the neighbor block as 0; or, for each of the neighbor blocks, if an opposite number of a difference between the sketch value $AvgInt_{pivotblock}$ of the pivot block and a sketch value $AvgInt_{neighborblock_k}$ of the $k^{th}$ neighbor block is not less than the threshold $\theta_0$, label a position of the neighbor block as 1, and otherwise, if the opposite number of the difference between the sketch value $AvgInt_{pivotblock}$ of the pivot block and the sketch value $AvgInt_{neighborblock_k}$ of the $k^{th}$ neighbor block is less than the threshold $\theta_0$, label the position of the neighbor block as 0.

According to a fourth aspect, an embodiment of the present invention provides a face detection apparatus, where the apparatus includes a traversing module configured to traverse a to-be-detected image so as to obtain a to-be-detected subimage set; a calculating module configured to bring each to-be-detected subimage in the to-be-detected subimage set that is obtained by traversing by the traversing module into the face detector, and calculate, layer by layer, output of a first classifier at each layer in the face detector; a determining module configured to, for each to-be-detected subimage, determine the output that is of the first classifier at each layer and is calculated by the calculating module, and consider that the to-be-detected subimage is a non-face if output of a first classifier at any layer of the face detector is less than a threshold that is of the first classifier and is obtained by training, where only a to-be-detected subimage that passes determining of classifiers at all layers is considered as a face; and a combining module configured to combine all detection results that are obtained by the determining module, and output a position of a face in the to-be-detected image.

In a first possible implementation manner of the fourth aspect, the traversing module is configured to traverse the to-be-detected image in a detection window with a preset length-width ratio; enlarge the detection window by the preset length-width ratio according to a preset step to traverse the to-be-detected image, and repeat this operation to traverse the to-be-detected image in a different detection window until length of the detection window is greater than or equal to length of the to-be-detected image or until width of the detection window is greater than or equal to width of the to-be-detected image; and perform normalization processing on subimages that are obtained by traversing the to-be-detected image as described above, so that a length-width ratio of each subimage conforms to the preset length-width ratio, and use a set that consists of all normalized subimages as the to-be-detected subimage set.

Embodiments of the present invention provide a face detector training method, a face detection method, and apparatuses. During a training phase, a flexible block based local binary pattern feature and a corresponding weak classifier are constructed, appropriate weak classifiers are found to generate multiple strong classifiers, and multiple layers of strong classifiers that are obtained by using a cascading method form a final face detector. During a detection phase, face detection is performed on a to-be-detected image by using a strong classifier or a face detector that is learned during a training process, so that a face is differentiated from a non-face, and a face detection result is combined and output. During this process, each FBLBP feature includes one pivot block and at least one neighbor block. The pivot block and the neighbor block are equal in size, and positions of each neighbor block and the pivot block are not strictly limited. Therefore, flexibility is high, robustness is improved, and meanwhile a false detection rate is reduced.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figures 1, 2:
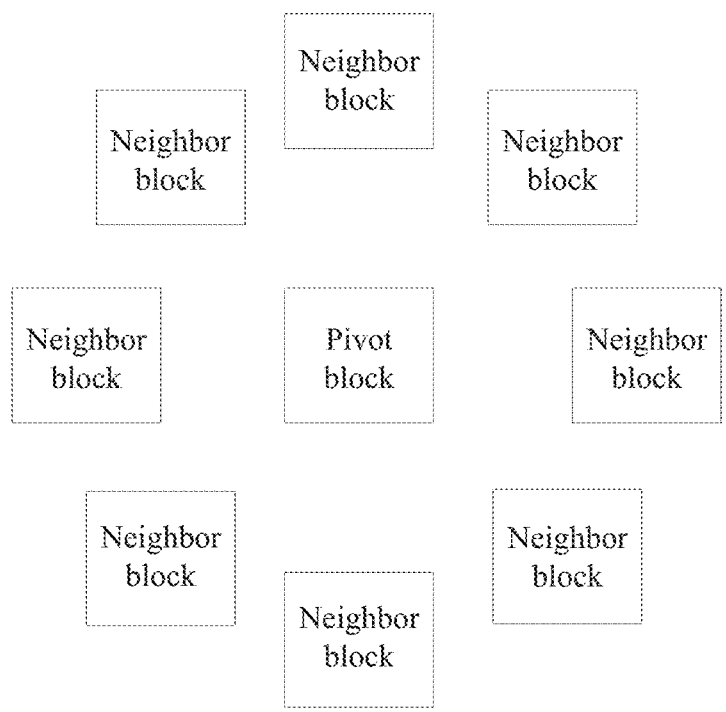
FIG. 1 is a schematic diagram of an MBLBP feature in the prior art.
FIG. 2 is a schematic diagram of an MSOF feature in the prior art.
Figure 3:
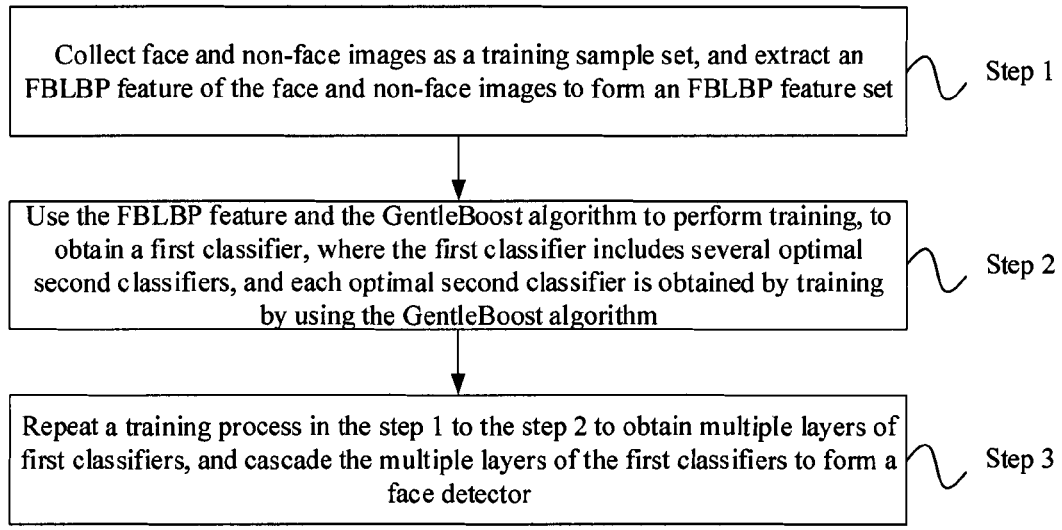
FIG. 3 is a flowchart of Embodiment 1 of a face detector training method according to the present invention.

FIG. 3 is a flowchart of Embodiment 1 of a face detector training method according to the present invention. In this embodiment, a face detector training process is mainly a process in which training is performed by using an image sample in a training sample set, an appropriate weak classifier set is found and combined into several strong classifiers, and then, by using a cascading method, multiple layers of strong classifiers form a final face detector. A training phase includes the following steps.

Step 1: Collect face and non-face images as a training sample set, and extract an FBLBP feature of the face and non-face images to form an FBLBP feature set.

In this step, an image that includes a face and an image that does not include a face are collected from the Internet or by using a camera as the training sample set, where an image sample that includes a face may be referred to as a positive sample, and an image sample that does not include a face may be referred to as a negative sample. There may be multiple positive samples and negative samples. A specific quantity may be determined according to a specific requirement. After the training sample set is collected, an FBLBP feature is extracted from face and non-face images to form an FBLBP feature set, and an FBLBP weak classifier that can differentiate face and non-face images is constructed for each FBLBP feature in the FBLBP feature set.

Step 2: Use the FBLBP feature and the GentleBoost algorithm to perform training to obtain a first classifier, where the first classifier includes several optimal second classifiers, and each optimal second classifier is obtained by training by using the GentleBoost algorithm.

Generally, in a process of performing training on a feature by using the GentleBoost algorithm, a second classifier is obtained first, where the second classifier is a classifier of relatively low precision, then several optimal classifiers of relatively high precision are selected from multiple second classifiers, and training is continued on the several optimal classifiers to obtain a second classifier of relatively higher precision, that is, a strong classifier. Unless otherwise stated below, a first classifier is a strong classifier and a second classifier is a weak classifier.

In this step, the GentleBoost algorithm is used to perform feature selection among all FBLBP features that are enumerated in the step 1 to obtain several optimal weak classifiers, and then accumulate the weak classifiers to obtain a strong classifier.

Step 3: Repeat a training process from the step 1 to the step 2 to obtain multiple layers of first classifiers, and cascade the multiple layers of first classifiers to form a face detector.

It should be noted that, for the first classifier at each layer, that is, the strong classifier, both a maximum number of weak classifiers and classification precision of the strong classifier may be set. If a requirement for the number of weak classifiers is not met and the precision does not meet a set requirement, the step 1 is performed again to retrain the samples. Otherwise, if the number of weak classifiers at each layer reaches a maximum value or after the precision meets a requirement, training of first classifiers at a next layer is performed (if it is the last layer, training is completed), so as to avoid that the number of weak classifiers is excessively large during training of last several layers and efficiency is affected. In addition, for a learning process of each FBLBP weak classifier in a strong classifier at each layer, a maximum number of neighbor blocks may be set in a process of adding a neighbor block. If the number of neighbor blocks of a single FBLBP weak classifier does not reach a set maximum value, and classification precision increases after an optimal neighbor block is added, the neighbor block is added; otherwise, adding the neighbor block is stopped and a next GentleBoost cycle is started.

In a face detector training method provided by this embodiment of the present invention, a flexible block based local binary pattern feature and a corresponding weak classifier are constructed, appropriate weak classifiers are found to generate multiple strong classifiers, and multiple layers of strong classifiers that are obtained by using a cascading method form a final face detector. During this process, each FBLBP feature includes one pivot block and at least one neighbor block. The pivot block and the neighbor block are equal in size, and positions of each neighbor block and the pivot block are not strictly limited. Therefore, flexibility is high, robustness is improved, and meanwhile a false detection rate is reduced.

Optionally, in the foregoing Embodiment 1 shown in FIG. 3, the step 1 includes the following substeps.

Step 1.1: Construct the FBLBP feature to represent co-occurrence information of a relative change of local grayscale of an image, where the FBLBP feature includes several congruent rectangular blocks, a threshold, and a sign bit, where the several congruent rectangular blocks include one pivot block and at least one neighbor block; and when the sign bit is −1, the threshold is $\theta_0$, and when the sign bit is 1, the threshold is $\theta_1$, where $\theta_0$ and $\theta_1$ are real numbers.

Figure 4:
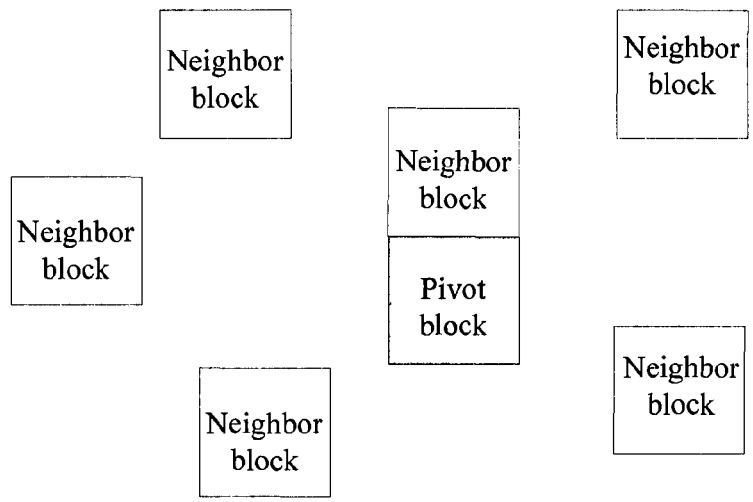
FIG. 4 is a schematic diagram of an FBLBP feature according to an embodiment of the present invention.

In this substep, the FBLBP feature, that is used to represent the co-occurrence information of the relative change of the local grayscale of the image is constructed. Each FBLBP feature includes several congruent rectangular blocks, a sign bit, and a threshold corresponding to the sigh bit. For example, when the sign bit is −1, the threshold is $\theta_0$; when the sign bit is 1, the threshold is $\theta_1$, where $\theta_0$ and $\theta_1$ are real numbers. The several rectangular blocks include one pivot block and at least one neighbor block. Referring to FIG. 4, FIG. 4 is a schematic diagram of an FBLBP feature according to this embodiment of the present invention.

As shown in FIG. 4, a pivot block is represented by a rectangular block filled with a light gray color and a neighbor block is represented by an unfilled rectangular block. Each FBLBP feature includes one pivot block and at least one neighbor block. Length and width of the pivot block are equal to length and width of the neighbor block. Positions of each neighbor block and the pivot block are not strictly limited. In this step, a face may be cut out from an image that includes a human face and other sceneries as a positive sample, and this positive sample may be scaled to specified dimensions, for example, 24×24, according to a requirement. In addition, an image that does not include a human face may be directly scaled to specified dimensions as a negative sample. After an image sample that meets a requirement is prepared, according to a preset parameter requirement of an FBLBP feature, all FBLBP features meeting this parameter requirement may be enumerated. An FBLBP parameter requirement includes a position of the pivot block, a size of the pivot block, a maximum number of neighbor blocks, a position of a neighbor block relative to the pivot block, a sign bit, a threshold corresponding to the sigh bit, and the like.

Step 1.2: Calculate a sketch value $AvgInt_{pivotblock}$ of the pivot block in the FBLBP feature and a sketch value $AvgInt_{neighborblock_k}$ of or each of the neighbor block in the FBLBP feature, where the sketch value $AvgInt_{pivotblock}$ of the pivot block is represented by average grayscale of an area in which the pivot block is located, the sketch value $AvgInt_{neighborblock_k}$ of or each of the neighbor block is represented by average grayscale of each area in which one of the neighbor blocks is located, and k is a sequence number of the $k^{th}$ neighbor block; for each of the neighbor blocks, calculate a differential result according to the sign bit, and compare and quantize the differential result and the threshold; and convert a binary number that consists of quantization results of all the neighbor blocks into a decimal number, and save the decimal number to obtain a sketch value of the FBLBP feature.

An integral image technology is a matrix representation method that can describe global information. In this step, after the FBLBP feature is constructed, a sketch value of each FBLBP feature is calculated by using the integral image technology. An average grayscale value of each rectangular block in the FBLBP feature is calculated first and a sketch value of the corresponding rectangular block is represented by using the average grayscale value. For example, the sketch value $AvgInt_{pivotblock}$ of the pivot block is represented by the average grayscale of the area in which the pivot block is located, and the sketch value $AvgInt_{neighborblock}$ of the neighbor block is represented by the average grayscale of the area in which the neighbor block is located. After a sketch value of each rectangular block is calculated, for each neighbor block, a difference between the sketch value $AvgInt_{pivotblock}$ of the pivot block and the sketch value $AvgInt_{neighborblock}$ of the neighbor block is calculated, and a differential result is obtained according to the sign bit. Then the differential result and the threshold corresponding to the sign bit are compared, and then quantized according to a comparison result. For an FBLBP feature, after quantization results of all neighbor blocks of this FBLBP feature are obtained, a binary number that consists of all the quantization results is converted into a decimal number, and the decimal number is used as the sketch value of this FBLBP feature.

Optionally, in the foregoing Embodiment 1 shown in FIG. 3, in the step 2 of using the FBLBP feature and the GentleBoost algorithm to perform training to obtain a first classifier, where the first classifier consists of several optimal second classifiers, and each optimal second classifier is obtained by training by using the GentleBoost algorithm, a calculation formula (1) of a second classifier is as follows:

$$f_m(x) = \begin{cases} a_0, & x = 0 \\ a_1, & x = 1 \\ \ldots \\ a_{2^K-1}, & x = 2^K - 1 \end{cases};$$

where, $f_m(x)$ is the $m^{th}$ second classifier, that is, the $m^{th}$ weak classifier, x is a sketch value of an FBLBP feature of the weak classifier, K is the number of neighbor blocks of this FBLBP feature, and $a_j$ is output of a weak classifier, where $a_j$ may be calculated according to a formula (2):

$$a_j = \frac{\sum_i w_i y_i \delta(x_i = j)}{\sum_i w_i \delta(x_i = j)};$$

where, $0 \leq j \leq 2^k - 1$ and j is an integer; $y_i$ is a class of the $i^{th}$ training sample, where when the training sample is a face image, a value of $y_i$ is 1, and when the training sample is not a face image, the value of $y_i$ is −1; $\delta(\ )$ is a Kronecker function, where if $x_i = j$ is true, output is 1, and if $x_i = j$ is false, output is 0; i is the $i^{th}$ training image sample; and $\omega_i$ is weight of the $i^{th}$ training image sample.

Further, in the foregoing embodiment, the weight $\omega_i$ of the $i^{th}$ training image sample is obtained, by calculation, according to a formula (3) and a normalization formula (4).

The formula (3) is $\omega_i = \omega_i \times e^{-y_i f_m(x_i)}$.

The formula (4) is $$\omega_i = \frac{\omega_i}{\sum_i \omega_i}.$$

Further, in the foregoing embodiment, a sketch value x of an FBLBP feature of each second classifier in the formula (1) is obtained, by calculation, according to a formula (5). The formula (5) is as follows:

$$x = \sum_{k=1}^{K} 2^{k-1} FBLBP_{sign,k},$$

where K is the number of neighbor blocks;
if sign=1, $FBLBP_{sign,k} = \delta((AvgInt_{pivotblock} - AvgInt_{neighborblock_k}) \leq \theta_1)$; and
if sign=−1, $FBLBP_{sign,k} = \delta((AvgInt_{pivotblock} - AvgInt_{neighborblock_k}) \leq \theta_0)$;
where $\delta(\ )$ is a Kronecker function; when input is true, output is 1; otherwise, when input is false, output is 0.

Optionally, in the foregoing Embodiment 1, in the step 2 of using the FBLBP feature and the GentleBoost algorithm to perform training so as to obtain a first classifier, where the first classifier consists of several optimal second classifiers, a process of calculating the optimal second classifiers includes the following substeps.

Step 2.1: Initially, the FBLBP feature includes only one pivot block and one neighbor block, where an FBLBP feature set of the FBLBP feature that consists of the two rectangular blocks may be obtained by using Brute force and traversal; for each FBLBP feature in the FBLBP feature set, calculate a sketch value of the FBLBP feature and an output value of a corresponding second classifier; substitute the obtained output value of the second classifier into a formula (6) to obtain an error J of the second classifier; and select a second classifier having a smallest value of the error J as the optimal second classifier, where the formula (6) is as follows:

$$J = \sum_{i=1}^{N} w_i(y_i - f_m(x_i))^2,$$

where, J is an optimized objective function, that is, a classification error, and N is the total number of training samples.

Figure 5A:
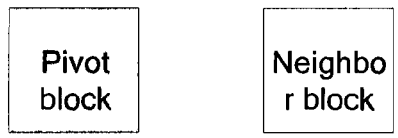
FIG. 5A is a schematic diagram of an FBLBP feature whose pivot block is separated from a neighbor block according to an embodiment of the present invention.
Figure 5B:
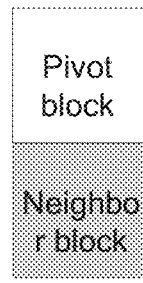
FIG. 5B is a schematic diagram of an FBLBP feature whose pivot block is adjacent to a neighbor block according to an embodiment of the present invention.
Figure 5C:
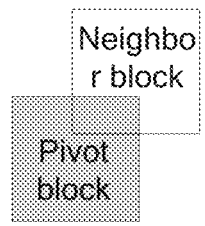
FIG. 5C is a schematic diagram of an FBLBP feature whose pivot block intersects with a neighbor block according to an embodiment of the present invention.

In this step, an FBLBP feature that includes only one pivot block and one neighbor block is shown in FIG. 5A, FIG. 5B, and FIG. 5C. FIG. 5A is a schematic diagram of an FBLBP feature whose pivot block is separated from a neighbor block according to this embodiment of the present invention. FIG. 5B is a schematic diagram of an FBLBP feature whose pivot block is adjacent to a neighbor block according to this embodiment of the present invention. FIG. 5C is a schematic diagram of an FBLBP feature whose pivot block intersects with a neighbor block according to this embodiment of the present invention. It may be learned from FIG. 5B that, when the number of neighbor blocks and the number of pivot blocks are both 1, and the neighbor block is adjacent to the pivot block, the FBLBP feature in this embodiment of the present invention is an edge feature of a Haar-Like feature.

Step 2.2: After the FBLBP feature that includes only one pivot block and one neighbor block is determined according to the step 2.1, increase the number of neighbor blocks for the FBLBP feature by traversing, in an image, rectangular blocks that have a same size as the pivot block; re-calculate a value x by substituting the sketch value of the FBLBP feature into the formula (5); calculate the error J by substituting the value x into the formula (6); if J further decreases, incorporate a new neighbor block into a current optimal second classifier; if J does not decrease, stop incorporation, directly output the current feature, and meanwhile update weight and enter a next GentleBoost cycle.

A calculation formula (7) for combining an optimal second classifier of each GentleBoost cycle into the first classifier in the step 2 is as follows:

$$F(x) = F(x) + f_m(x),$$

where, F(x) is the first classifier, that is, the strong classifier, and F(x) is initialized to 0.

Further, a threshold of the first classifier may be determined according to a formula (8), where the formula (8) is as follows:

$$th = \mathrm{argmax}\left(\sum_{i_1 \in Face} \delta(F(x_{i_1}) \geq th) + \sum_{i_2 \in Non\text{-}face} \delta(F(x_{i_2}) < th)\right);$$

where $i_1$ is the $i_1^{th}$ training image sample that includes a face; $i_2$ is the $i_2^{th}$ training image sample that includes a non-face; and th is the threshold of the strong classifier.

Optionally, in the foregoing Embodiment 1, in the step 1.2, for each of the neighbor blocks, calculating a differential result according to the sign bit, and comparing and quantizing the differential result and the threshold; and finally, converting a binary number that consists of quantization results of all the neighbor blocks into a decimal number, and saving the decimal number to obtain a sketch value of the FBLBP feature includes, for each neighbor block, when the sign bit is 1, if a difference between the sketch value $AvgInt_{pivotblock}$ of the pivot block and a sketch value $AvgInt_{neighborblock_k}$ of the $k^{th}$ neighbor block is not less than the threshold $\theta_1$, labeling a position of the neighbor block as 1, and otherwise, if the difference between the sketch value $AvgInt_{pivotblock}$ of the pivot block and the sketch value $AvgInt_{neighborblock_k}$ of the $k^{th}$ neighbor block is less than the threshold $\theta_1$, labeling the position of the neighbor block as 0; or, for each of the neighbor blocks, when the sign bit is −1, if an opposite number of a difference between the sketch value $AvgInt_{pivotblock}$ of the pivot block and a sketch value $AvgInt_{neighborblock_k}$ of the $k^{th}$ neighbor block is not less than the threshold $\theta_0$, labeling a position of the neighbor block as 1, and otherwise, if the opposite number of the difference between the sketch value $AvgInt_{pivotblock}$ of the pivot block and the sketch value $AvgInt_{neighborblock_k}$ of the $k^{th}$ neighbor block is less than the threshold $\theta_0$, labeling the position of the neighbor block as 0.

Figure 6:
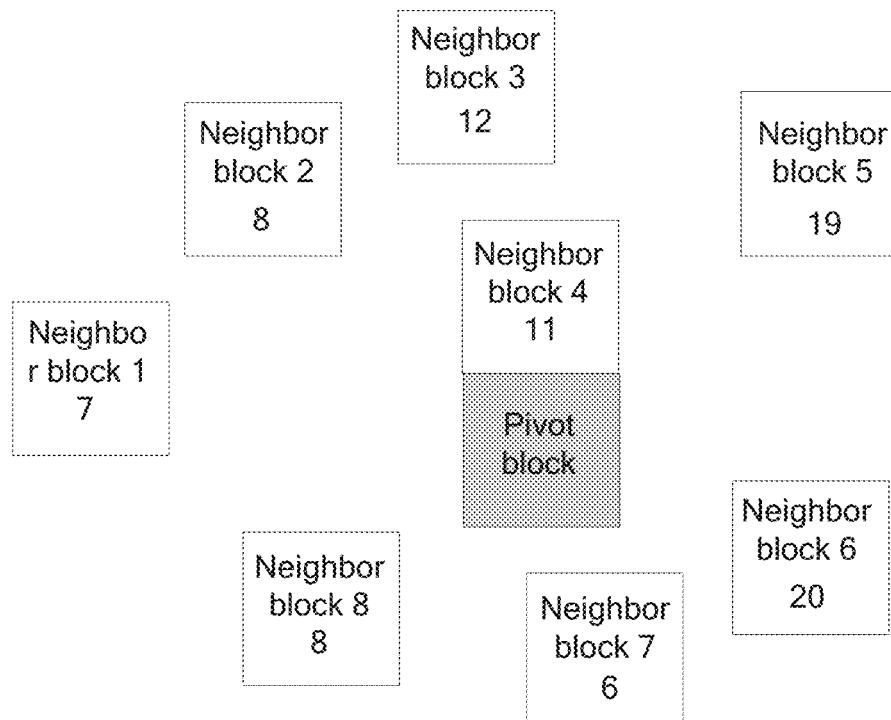
FIG. 6 is a schematic diagram of another FBLBP feature according to an embodiment of the present invention.

The following uses FIG. 6 as an example to describe in detail how to calculate a sketch value of an FBLBP feature in this embodiment of the present invention. Refer to FIG. 6.

FIG. 6 is a schematic diagram of another FBLBP feature according to this embodiment of the present invention. As shown in FIG. 6, this FBLBP feature includes 8 neighbor blocks and one pivot block. When a sign bit is −1, a threshold $\theta_0$ is 2; when a sign bit is 1, a threshold $\theta_1$ is −3.

Referring to FIG. 6, average grayscale of an area in which the pivot block is located is 9, that is, a sketch value $AvgInt_{pivotblock}$ of the pivot block is 9, and average grayscale of areas in which a neighbor block 1 to a neighbor block 8 are located is respectively 7, 8, 12, 11, 19, 20, 6, and 8, that is, sketch values $AvgInt_{neighborblock_1}$ to $AvgInt_{neighborblock_8}$ of the neighbor block 1 to the neighbor block 8 are respectively 7, 8, 12, 11, 19, 20, 6, and 8.

Figure 7A:
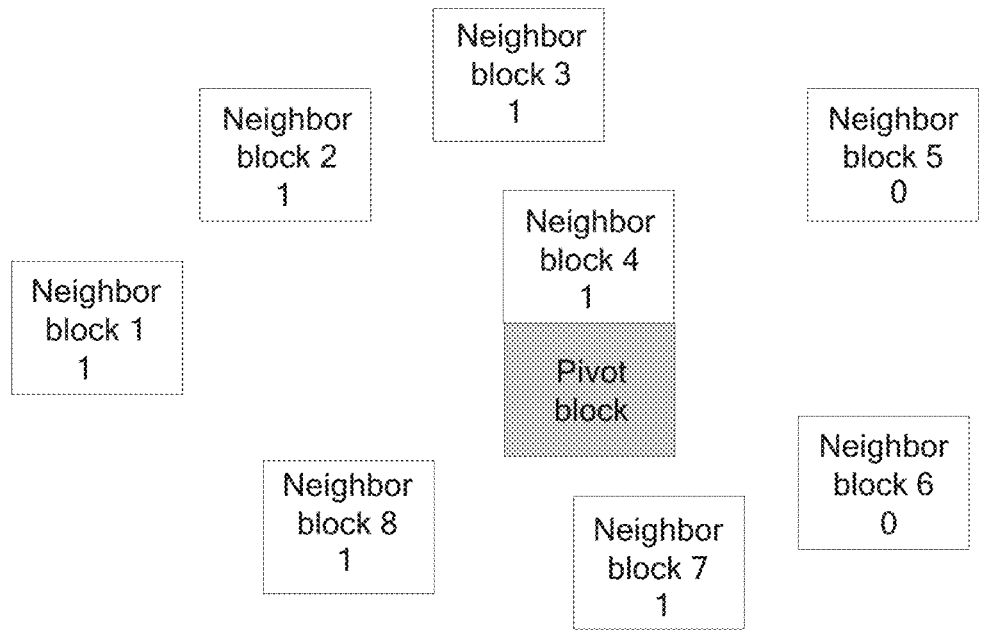
FIG. 7A is a labeling diagram of each neighbor block in FIG. 6 when a sign bit is 1.

When the sign bit is 1, differences between the sketch value $AvgInt_{pivotblock}$ of the pivot block and the sketch value $AvgInt_{neighborblock}$ of the neighbor block 1 to the neighbor block 8 are 2, 1, −3, −2, −10, −11, 3, and 1 in sequence. The differences between the sketch value $AvgInt_{pivotblock}$ of the pivot block and the sketch values $AvgInt_{neighborblock_1}$, $AvgInt_{neighborblock_2}$, $AvgInt_{neighborblock_3}$, $AvgInt_{neighborblock_4}$, $AvgInt_{neighborblock_7}$, $AvgInt_{neighborblock_8}$ of the neighbor block 1, the neighbor block 2, the neighbor block 3, the neighbor block 4, the neighbor block 7, and the neighbor block 8 are not less than the threshold $\theta_1$ ($\theta_1$=−3). Therefore, the neighbor block 1, the neighbor block 2, the neighbor block 3, the neighbor block 4, the neighbor block 7, and the neighbor block 8 are labeled as 1. Whereas, the differences between the sketch value $AvgInt_{pivotblock}$ of the pivot block and the sketch values $AvgInt_{neighborblock_5}$ and $AvgInt_{neighborblock_6}$ of the neighbor block 5 and the neighbor block 6 are less than $\theta_1$ ($\theta_1$=−3). Therefore, the neighbor block 5 and the neighbor block 6 are labeled as 0. Referring to FIG. 7A, FIG. 7A is a labeling diagram of each neighbor block in FIG. 6 when the sign bit is 1. According to a sequence of the neighbor block 1 to the neighbor block 8, an obtained binary sequence is 11110011.

Figure 7B:
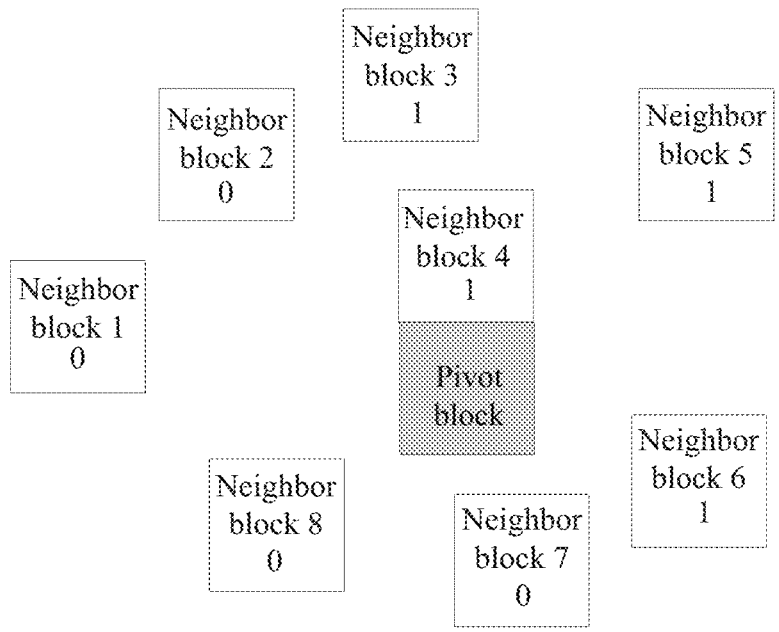
FIG. 7B is a labeling diagram of each neighbor block in FIG. 6 when a sign bit is 1.

When the sign bit is 0, differences between the sketch value $AvgInt_{pivotblock}$ of the pivot block and the sketch values $AvgInt_{neighborblock_1}$ to $AvgInt_{neighborblock_8}$ of the neighbor block 1 to the neighbor block 8 are 2, 1, −3, −2, −10, −11, 3, and 1 in sequence, that is, opposite numbers of the differences between the sketch value $AvgInt_{pivotblock}$ of the pivot block and the sketch values $AvgInt_{neighborblock_1}$ to $AvgInt_{neighborblock_8}$ of or the neighbor block 1 to the neighbor block 8 are −2, −1, 3, 2, 10, 11, −3, and −1 in sequence. The opposite numbers of the differences between the sketch value $AvgInt_{pivotblock}$ of the pivot block and the sketch values $AvgInt_{neighborblock_3}$, $AvgInt_{neighborblock_4}$, $AvgInt_{neighborblock_5}$, $AvgInt_{neighborblock_6}$ of the neighbor block 3, the neighbor block 4, the neighbor block 5, and the neighbor block 6 are not less than the threshold $\theta_0$ ($\theta_0$=2). Therefore, the neighbor block 3, the neighbor block 4, the neighbor block 5, and the neighbor block 6 are labeled as 1. Whereas, the opposite numbers of the differences between the sketch value $AvgInt_{pivotblock}$ of the pivot block and the sketch values $AvgInt_{neighborblock_1}$, $AvgInt_{neighborblock_2}$, $AvgInt_{neighborblock_7}$, $AvgInt_{neighborblock_8}$ of the neighbor block 1, the neighbor block 2, the neighbor block 7, and the neighbor block 8 are less than $\theta_0$ ($\theta_0$=2). Therefore, the neighbor block 1, the neighbor block 2, the neighbor block 7, and the neighbor block 8 are labeled as 0. Referring to FIG. 7B, FIG. 7B is a labeling diagram of each neighbor block in FIG. 6 when the sign bit is −1. According to the sequence of the neighbor block 1 to the neighbor block 8, an obtained binary sequence is 00111100.

Figure 8:
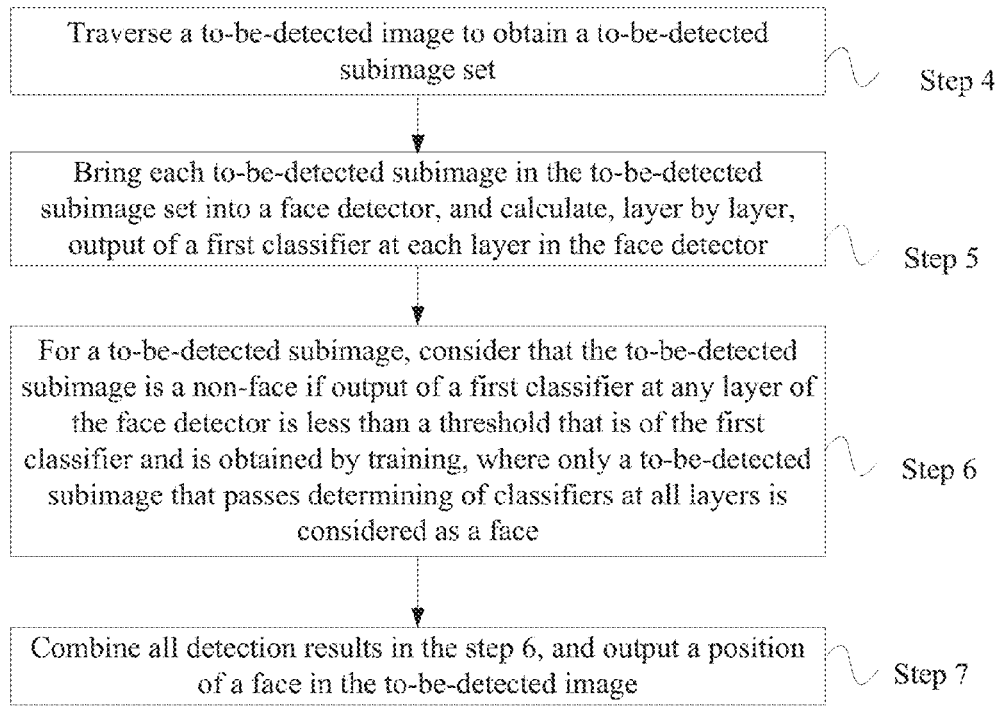
FIG. 8 is a flowchart of face detection performed by using a face detector according to the present invention.

In addition, based on the foregoing face detector training method, an embodiment of the present invention further provides a method for performing face detection by using a face detector that is obtained by using the face detector training method. In this method, face detection is performed on a to-be-detected image by using a first classifier or a face detector that is learned from a training process, so that a face is differentiated from a non-face. Referring to FIG. 8, FIG. 8 is a flowchart of face detection performed by using a face detector according to the present invention, and the flowchart includes the following steps.

Step 4: Traverse a to-be-detected image to obtain a to-be-detected subimage set.

In this step, a preset ratio may be set according to a different scenario. Preset ratios under different scenarios may be different. For example, it is assumed that the to-be-detected image is a 100×200 image; then, 24×24 pixels may be used as a reference to continuously enlarge a detection window (100×100 at maximum, which is equal to a smaller value between length and width of the to-be-detected image) according to a ratio of 1:1.1, an obtained window is used to traverse the to-be-detected image at a step of 2, and obtained sub-windows (24×24, 26×26, . . . , 100×100) of the to-be-detected image are all scaled to a square whose length and width are both 24 pixels, so as to obtain the to-be-detected subimage set. In another possible implementation manner, a preset ratio may also be another value, for example, 1:1.2, which is not limited in the present invention.

Step 5: Bring each to-be-detected subimage in the to-be-detected subimage set into a face detector, and calculate, layer by layer, output of a first classifier at each layer in the face detector.

Step 6: For a to-be-detected subimage, consider that the to-be-detected subimage is a non-face if output of a first classifier at any layer of the face detector is less than a threshold that is of the first classifier and is obtained by training, where only a to-be-detected subimage that passes determining of classifiers at all layers is considered as a face.

Figure 9:
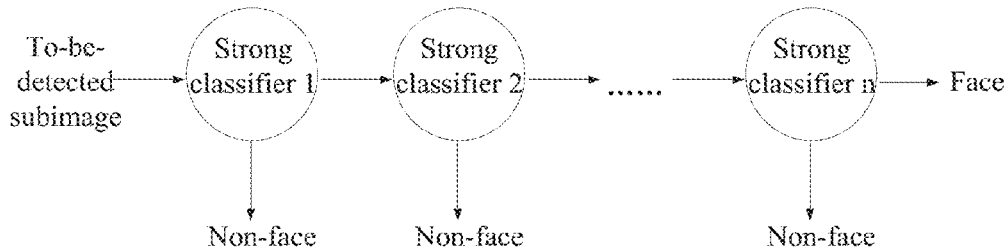
FIG. 9 is a schematic structural diagram of a face detector according to an embodiment of the present invention.

In this step, a next layer is entered only after a to-be-detected subimage passes a strong classifier at a previous layer. As a result, a large number of non-target subimages to be detected, for example, a to-be-detected subimage that does not include a face, may be quickly excluded at the first several layers, thereby saving time to perform detection on a target to-be-detected subimage. Referring FIG. 9, FIG. 9 is a schematic structural diagram of a face detector according to an embodiment of the present invention. Referring to FIG. 9, each layer of the face detector corresponds to a strong classifier that is trained by using the GentleBoost algorithm. During detection, it is determined that a to-be-detected subimage is a face image only when the to-be-detected subimage passes determining of all layers, that is, output of the to-be-detected subimage of a strong classifier at each layer is greater than a threshold of this strong classifier. Otherwise, if output of a strong classifier at any layer is less than a threshold of the strong classifier at this layer, a to-be-detected subimage is considered as a non-face image and is immediately abandoned.

Step 7: Combine all detection results in the step 6 to output a position of a face in the to-be-detected image.

A non-maximum suppression method may be used to implement combination of all detection results in the step 6.

According to the face detection method provided by this embodiment of the present invention, face detection is performed on a to-be-detected image by using a strong classifier or a face detector that is learned in a training process, so that a face is differentiated from a non-face, and face detection results are combined and output. During this process, each FBLBP feature includes one pivot block and at least one neighbor block. The pivot block and the neighbor block are equal in size, and positions of each neighbor block and the pivot block are not strictly limited. Therefore, flexibility is high, robustness is improved, and meanwhile a false detection rate is reduced.

Optionally, in the foregoing embodiment shown in FIG. 8, the step 4 includes the following substeps.

Step 4.1: Traverse the to-be-detected image in a detection window with a preset length-width ratio.

Step 4.2: Enlarge the detection window by the preset length-width ratio according to a preset step to traverse the to-be-detected image, and repeat this operation to traverse the to-be-detected image in a different detection window until length of the detection window is greater than or equal to length of the to-be-detected image or until width of the detection window is greater than or equal to width of the to-be-detected image.

Step 4.3: Perform normalization processing on subimages that are obtained by traversing the to-be-detected image in the step 4.1 and the step 4.2, so that a length-width ratio of each subimage conforms to the preset length-width ratio, and use a set that consists of all normalized subimages as the to-be-detected subimage set.

To clearly compare beneficial effects of a face detection method of the present invention with those of a face detection method in the prior art, the following uses Table 1 for a detailed comparison. Table 1 is an effect comparison table of a face detection method provided by the present invention and a face detection method in the prior art.

TABLE 1

Face Detection Database (Number of Correct Detections/Number of False Detections)

| Test Dimension (Number of Images) | Competitor in China | International Competitor | FBLBP |
|---|---|---|---|
| Age - Baby (113) | 104/12 | 111/5 | 111/1 |
| Age - Children (105) | 104/11 | 103/3 | 108/2 |
| Age - Elder (107) | 102/13 | 105/3 | 108/3 |
| Backlight (145) | 139/4 | 143/2 | 137/0 |
| Complex Angle (116) | 112/2 | 116/1 | 116/0 |
| Exp - Frown (92) | 92/1 | 92/0 | 91/0 |
| Exp - Full smile1 (102) | 102/1 | 102/0 | 102/0 |
| Exp - Half smile (113) | 113/0 | 110/0 | 113/0 |
| Exp - Other (63) | 63/0 | 62/1 | 63/0 |
| Maxnum (4) | 69/0 | 14/0 | 81/1 |
| No face (32) | 0/1 | 0/1 | 0/0 |
| Normal (133) | 151/1 | 151/0 | 151/1 |
| Occa - Glasses (117) | 112/5 | 121/0 | 121/0 |
| Occa - Hair (55) | 50/1 | 52/0 | 57/1 |
| Occa - Hand (43) | 25/6 | 23/3 | 28/1 |
| Occa - Hat (103) | 93/20 | 99/7 | 101/2 |
| Occa - Sunglasses (99) | 75/12 | 95/12 | 105/4 |
| Pitch (56) | 56/0 | 56/0 | 56/0 |
| Race - Black (166) | 159/8 | 176/3 | 171/2 |
| Race - Brown (70) | 70/3 | 70/0 | 70/0 |
| Race - White (144) | 144/1 | 143/1 | 144/1 |
| Rotation - ( ) (111) | 110/1 | 110/1 | 111/0 |
| Yaw - 22.5 (130) | 122/2 | 128/0 | 130/1 |
| Total (2219) | 2167/105 | 2182/43 | 2275/20 |

It may be learned from Table 1 that, a true positive rate of an FBLBP feature-based face detection method in this embodiment of the present invention is higher than a true positive rate of detection by other international competitors and competitors in China, and a false detection rate is less than a false detection rate of detection by other international competitors and competitors in China.

In addition, to further compare beneficial effects of the face detection method of the present invention and those of the face detection method in the prior art clearly, the following describes a test performed by using an international open FDDB. For a specific result, refer to FIG. 10A and FIG. 10B.

Figure 10A:
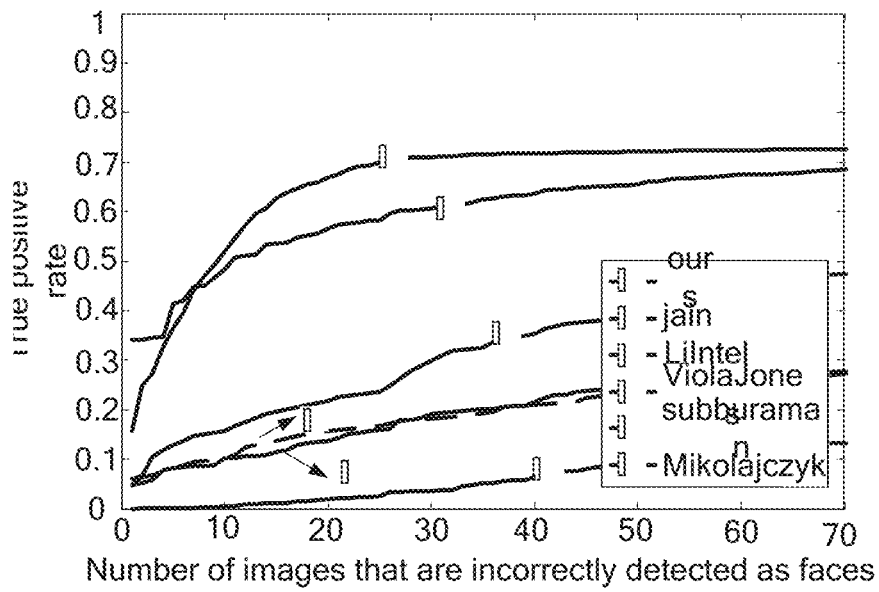
FIG. 10A is a schematic diagram of discrete fractions, in a face detection database (FDDB), of detection performance of a face detection method according to an embodiment of the present invention and detection performance of a face detection method in the prior art.
Figure 10B:
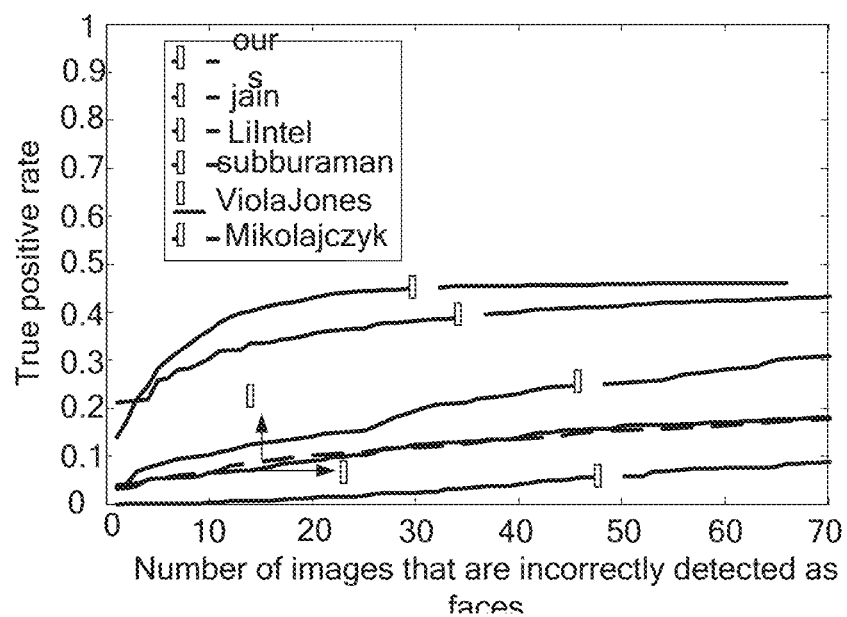
FIG. 10B is a schematic diagram of continued fractions, in an FDDB, of detection performance of a face detection method according to an embodiment of the present invention and detection performance of a face detection method in the prior art.

FIG. 10A is a schematic diagram of discrete fractions, in an FDDB, of detection performance of a face detection method according to an embodiment of the present invention and detection performance of a face detection method in the prior art. FIG. 10B is a schematic diagram of continued fractions, in an FDDB, of detection performance of a face detection method according to an embodiment of the present invention and detection performance of a face detection method in the prior art. As shown in FIG. 10A and FIG. 10B, a horizontal coordinate axis is the number of images in a data set that are incorrectly detected by the face detector as faces (False Negative (FN)); a vertical coordinate axis is a true positive rate (TPR); a curve ① represents fractions, in an FDDB, of a detection result of the face detection method (indicated as ours in the figure) provided by this embodiment of the present invention; a curve ② represents fractions, in the FDDB, of a detection result of a jain model; a curve ③ represents fractions, in the FDDB, of a detection result of a LiIntel model; a curve ④ represents fractions, in the FDDB, of a detection result of a subburaman model; a curve ⑤ represents fractions, in the FDDB, of a detection result of a Viola Jones model; and a curve ⑥ represents fractions, in the FDDB, of a detection result of a Mikolajczyk model. In FIG. 10A, fractions are discrete fractions; and in FIG. 10B, fractions are continued fractions. It may be learned from FIG. 10A and FIG. 10B that, under a certain condition, for example, when the number of positive samples that are predicted as negative samples by the face detector exceeds 10, and a same number of errors is received, the face detection method provided by this embodiment of the present invention has a highest true positive rate.

Figure 11:
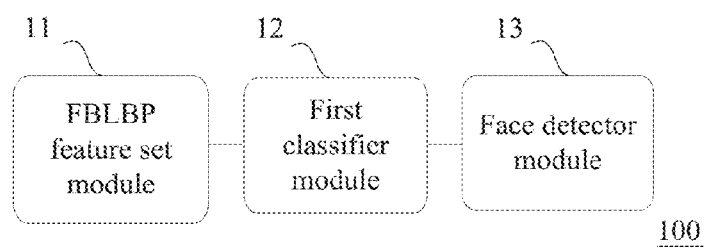
FIG. 11 is a schematic structural diagram of Embodiment 1 of a face detector training apparatus according to the present invention.

FIG. 11 is a schematic structural diagram of Embodiment 1 of a face detector training apparatus according to the present invention. The face detector training apparatus provided by this embodiment of the present invention is configured to implement a face detector training method provided by Embodiment 1 of the present invention. For an implementation principle and an effect, refer to the foregoing Embodiment 1 shown in FIG. 3, which is not described herein again. The face detector training apparatus 100 provided by this embodiment of the present invention includes an FBLBP feature set module 11 configured to collect face and non-face images as a training sample set, and extract an FBLBP feature of the face and non-face images to form an FBLBP feature set; a first classifier module 12 configured to perform training, by using the FBLBP feature that is obtained by collection by the FBLBP feature set module 11 and the GentleBoost algorithm, to obtain a first classifier, where the first classifier includes several optimal second classifiers, and each optimal second classifier is obtained by training by using the GentleBoost algorithm; and a face detector module 13 configured to repeat a training process of the FBLBP feature set module 11 and the first classifier module 12 to obtain multiple layers of first classifiers, and cascade the multiple layers of first classifiers to form a face detector.

With a face detector training apparatus provided by this embodiment of the present invention, a flexible block based local binary pattern feature and a corresponding weak classifier are constructed, appropriate weak classifiers are found to generate multiple strong classifiers, and multiple layers of strong classifiers that are obtained by using a cascading method form a final face detector. During this process, each FBLBP feature includes one pivot block and at least one neighbor block. The pivot block and the neighbor block are equal in size, and positions of each neighbor block and the pivot block are not strictly limited. Therefore, flexibility is high, robustness is improved, and meanwhile a false detection rate is reduced.

Figure 12:
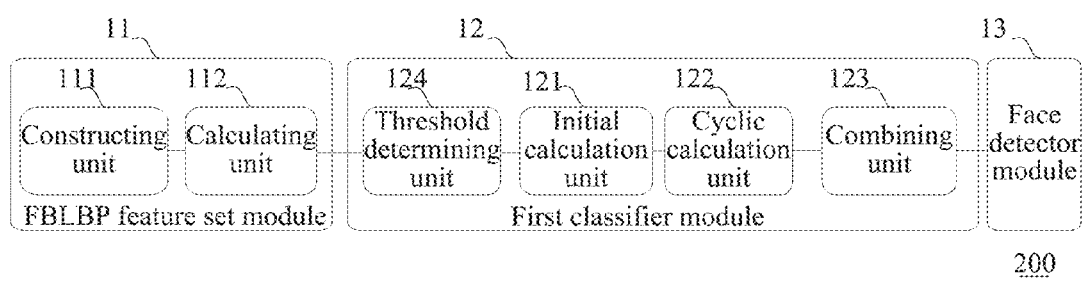
FIG. 12 is a schematic structural diagram of Embodiment 2 of a face detector training apparatus according to the present invention.

FIG. 12 is a schematic structural diagram of Embodiment 2 of a face detector training apparatus according to the present invention. As shown in FIG. 12, a face detector training apparatus 200 of this embodiment is based on an apparatus structure shown in FIG. 11, and the FBLBP feature set module 11 includes a constructing unit 111 configured to construct the FBLBP feature to represent co-occurrence information of a relative change of local grayscale of an image, where the FBLBP feature includes several congruent rectangular blocks, a threshold, and a sign bit, where the several congruent rectangular blocks include one pivot block and at least one neighbor block; and when the sign bit is 1, the threshold is $\theta_0$, and when the sign bit is 1, the threshold is $\theta_1$, where $\theta_0$ and $\theta_1$ are real numbers; and a calculating unit 112 configured to calculate a sketch value $AvgInt_{pivotblock}$ of the pivot block in the FBLBP feature that is constructed by the constructing unit 111 and a sketch value $AvgInt_{neighborblock_k}$ of each of the neighbor block in the FBLBP feature that is constructed by the constructing unit 111, where the sketch value $AvgInt_{pivotblock}$ of the pivot block is represented by average grayscale of an area in which the pivot block is located, the sketch value $AvgInt_{neighborblock_k}$ of each of the neighbor block is represented by average grayscale of an area in which each of the neighbor block is located respectively, and k is a sequence number of the $k^{th}$ neighbor block; for each of the neighbor block, calculate a differential result according to the sign bit, and compare and quantize the differential result and the threshold; and convert a binary number that consists of quantization results of all the neighbor blocks into a decimal number, and save the decimal number to obtain a sketch value of the FBLBP feature.

Optionally, in an embodiment of the present invention, the first classifier module 12 is configured to use the FBLBP feature and the GentleBoost algorithm to perform training to obtain the first classifier, where the first classifier consists of several optimal second classifiers, and each optimal second classifier is obtained by training by using the GentleBoost algorithm, where a calculation formula (1) of a second classifier is as follows:

$$f_m(x) = \begin{cases} a_0, & x = 0 \\ a_1, & x = 1 \\ \ldots \\ a_{2^K-1}, & x = 2^K - 1 \end{cases},$$

where $f_m(x)$ is the $m^{th}$ second classifier, x is a sketch value of an FBLBP feature of the second classifier, K is the number of neighbor blocks of the FBLBP feature, and $a_j$ is output of a second classifier, where $a_j$ is calculated according to a formula (2):

$$a_j = \frac{\sum_i w_i y_i \delta(x_i = j)}{\sum_i w_i \delta(x_i = j)},$$

where $0 \leq j \leq 2^K - 1$ and j is an integer; $y_i$ is a class of the $i^{th}$ training sample, where when the training sample is a face image, a value of $y_i$ is 1, and when the training sample is not a face image, the value of $y_i$ is $-1$; $\delta(\ )$ is a Kronecker function, where if $x_i = j$ is true, output is 1, and if $x_i = j$ is false, output is 0; i is the $i^{th}$ training image sample; and $\omega_i$ is weight of the $i^{th}$ training image sample.

Optionally, in an embodiment of the present invention, the first classifier module 12 is configured to obtain, by calculation, the weight $\omega_i$ of the ith training image sample according to a formula (3) and a normalization formula (4), where the formula (3) is $\omega_i = \omega_i \times e^{-y_i f_m(x_i)}$; and the formula (4) is $$\omega_i = \frac{\omega_i}{\sum_i \omega_i}.$$

Optionally, in an embodiment of the present invention, the first classifier module 12 is configured to obtain, by calculation, a sketch value x of an FBLBP feature of each second classifier in the formula (1) according to a formula (5), where the formula (5) is as follows:

$$x = \sum_{k=1}^{K} 2^{k-1} FBLBP_{sign,k},$$

where K is the number of neighbor blocks;
if sign=1, $FBLBP_{sign,k}=\delta((AvgInt_{pivotblock}-AvgInt_{neighborblock_k})\leq\theta_1)$; and
if sign=−1, $FBLBP_{sign,k}=\delta((AvgInt_{pivotblock}-AvgInt_{neighborblock_k})\leq\theta_0)$;
where $\delta()$ is a Kronecker function; when input is true, output is 1; and otherwise, when input is false, output is 0.

Referring to FIG. 12, optionally, in an embodiment of the present invention, the first classifier module 12 includes an initial calculation module 121 configured to initially, the FBLBP feature includes only one pivot block and one neighbor block, where an FBLBP feature set of an FBLBP feature that consists of the two rectangular blocks may be obtained by using Brute force and traversal; for each FBLBP feature in the FBLBP feature set, calculate a sketch value of the FBLBP feature and an output value of a corresponding second classifier; substitute the obtained output value of the second classifier into a formula (6) to obtain an error J of the second classifier; and select a second classifier having a smallest value of the error J as the optimal second classifier; where the formula (6) is as follows:

$$J = \sum_{i=1}^{N} w_i(y_i - f_m(x_i))^2,$$

where J is an optimized objective function, that is, a weighted classification error, and N is the total number of training samples; a cyclic calculation module 122 configured to, after the initial calculation unit 121 determines the FBLBP feature that includes only one pivot block and one neighbor block, increase the number of neighbor blocks for the FBLBP feature by traversing, in an image, rectangular blocks that have a same size as the pivot block; re-calculate a value x by substituting the sketch value of the FBLBP feature into the formula (5); calculate the error J by substituting the value x into the formula (6); if J further decreases, incorporate a new neighbor block into a current optimal second classifier; and if J does not decrease, stop incorporation, directly output the current feature, and meanwhile update weight and enter a next GentleBoost cycle; and a combining unit 123 configured to combine an optimal second classifier that is obtained in each cycle by the cyclic calculation unit 122 into the first classifier according to a formula (7), where the formula (7) is as follows:

$F(x)=F(x)+f_m(x)$, where $F(x)$ is the first classifier, and $F(x)$ is initialized to 0.

Optionally, referring to FIG. 12 again, in an embodiment of the present invention, the first classifier module 12 further includes a threshold determining unit 124 configured to determine a threshold of the first classifier according to a formula (8), where the formula (8) is as follows:

$$th = \mathrm{argmax}\left(\sum_{i_1 \in Face} \delta(F(x_{i_1}) \geq th) + \sum_{i_2 \in Non\text{-}face} \delta(F(x_{i_2}) < th)\right);$$

where $i_1$ is an $i_1^{th}$ training image sample that includes a face; $i_2$ is an $i_2^{th}$ training image sample that includes a non-face; and th is the threshold of the first classifier.

Optionally, in an embodiment of the present invention, the calculating unit 112 is configured to, for each neighbor block, when the sign bit is 1, if a difference between the sketch value $AvgInt_{pivotblock}$ of the pivot block and a sketch value $AvgInt_{neighborblock_k}$ of the kth neighbor block is not less than the threshold $\theta_1$, label a position of the neighbor block as 1, and otherwise, if the difference between the sketch value $AvgInt_{pivotblock}$ of the pivot block and the sketch value $AvgInt_{neighborblock_k}$ of the $k^{th}$ neighbor block is less than the threshold $\theta_1$, label the position of the neighbor block as 0; or, for each of the neighbor block, when the sign bit is −1, if an opposite number of a difference between the sketch value $AvgInt_{pivotblock}$ of the pivot block and a sketch value $AvgInt_{neighborblock_k}$ of the $k^{th}$ neighbor block is not less than the threshold $\theta_0$, label a position of the neighbor block as 1, and otherwise, if the opposite number of the difference between the sketch value $AvgInt_{pivotblock}$ of the pivot block and the sketch value $AvgInt_{neighborblock_k}$ of the $k^{th}$ neighbor block is less than the threshold $\theta_0$, label the position of the neighbor block as 0.

Figure 13:
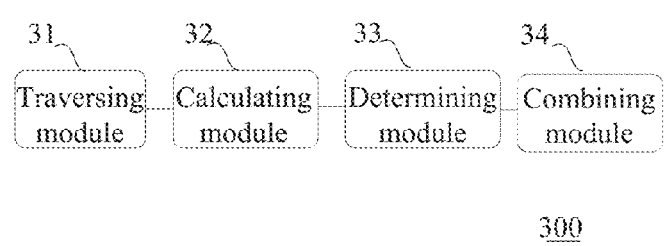
FIG. 13 is a schematic structural diagram of a face detection apparatus according to the present invention.

FIG. 13 is a schematic structural diagram of a face detection apparatus according to the present invention. The face detection apparatus provided by this embodiment of the present invention is used to implement the face detection method provided by the embodiment shown in FIG. 8 of the present invention. For an implementation principle and an effect, refer to the foregoing FIG. 8, which is not described herein again. The face detection apparatus 300 provided by this embodiment of the present invention includes a traversing module 31 configured to traverse a to-be-detected image so as to obtain a to-be-detected subimage set; a calculating module 32 configured to bring each to-be-detected subimage in the to-be-detected subimage set that is obtained by traversing by the traversing module 31 into the face detector, and calculate, layer by layer, output of a first classifier at each layer in the face detector; a determining module 33 configured to, for each to-be-detected subimage, determine the output that is of the first classifier at each layer and is calculated by the calculating module 32, and consider that the to-be-detected subimage is a non-face if output of a first classifier at any layer of the face detector is less than a threshold that is of the first classifier and is obtained by training, where only a to-be-detected subimage that passes determining of classifiers at all layers is considered as a face; and a combining module 34 configured to combine all detection results that are obtained by the determining module 33, and output a position of a face in the to-be-detected image.

With the face detection apparatus provided by this embodiment of the present invention, face detection is performed on a to-be-detected image by using a strong classifier or a face detector that is learned in a training process, so that a face is differentiated from a non-face, and face detection results are combined and output. During this process, each FBLBP feature includes one pivot block and at least one neighbor block. The pivot block and the neighbor block are equal in size, and positions of each neighbor block and the pivot block are not strictly limited. Therefore, flexibility is high, robustness is improved, and meanwhile a false detection rate is reduced.

Optionally, in the foregoing embodiment, the traversing module 31 is configured to traverse the to-be-detected image in a detection window with a preset length-width ratio; enlarge the detection window by the preset length-width ratio according to a preset step to traverse the to-be-detected image, and repeat this operation to traverse the to-be-detected image in a different detection window until length of the detection window is greater than or equal to length of the to-be-detected image or until width of the detection window is greater than or equal to width of the to-be-detected image; and perform normalization processing on subimages that are obtained by traversing the to-be-detected image as described above, so that a length-width ratio of each subimage conforms to the preset length-width ratio, and use a set that consists of all normalized subimages as the to-be-detected subimage set.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A face detector training method implemented by a computer having a processor, the method comprising:
    performing, by the processor, a training process by:
        collecting face and non-face images as a training image sample set;
        extracting a flexible block based local binary pattern (FBLBP) feature of the face and non-face images to form an FBLBP feature set; and
        using the FBLBP feature and a GentleBoost algorithm to perform training, to obtain a first classifier, wherein the first classifier comprises several optimal second classifiers, and wherein each optimal second classifier is obtained by training using the GentleBoost algorithm;
    repeating, by the processor, the training process to obtain multiple layers of first classifiers; and
    cascading, by the processor, the multiple layers of first classifiers to form a face detector.

2. The method according to claim 1, wherein collecting the face and the non-face images as the training image sample set and extracting the FBLBP feature of the face and the non-face images to form the FBLBP feature set comprises:
    constructing the FBLBP feature to represent co-occurrence information of a relative change of local grayscale of an image, wherein the FBLBP feature comprises several congruent rectangular blocks, a threshold, and a sign bit, wherein the several congruent rectangular blocks comprise one pivot block and at least one neighbor block, wherein the threshold is $\theta_0$ when the sign bit is −1, wherein the threshold is $\theta_1$ when the sign bit is 1, and wherein $\theta_0$ and $\theta_1$ are real numbers; and
    calculating a sketch value $AvgInt_{pivotblock}$ of the pivot block in the FBLBP feature and a sketch value $AvgInt_{neighborblock_k}$ of each of the neighbor blocks in the FBLBP feature, wherein the sketch value $AvgInt_{pivotblock}$ of the pivot block is represented by average grayscale of an area in which the pivot block is located, the sketch value $AvgInt_{neighborblock_k}$ of each of the neighbor blocks is represented by average gray-scale of an area in which each of the neighbor blocks is located separately, and k is a sequence number of the $k^{th}$ neighbor block;
    calculating a differential result according to the sign bit, and comparing and quantizing the differential result and the threshold for each of the neighbor blocks;
    converting a binary number that consists of a quantization result of each of the neighbor blocks into a decimal number; and
    saving the decimal number to obtain a sketch value of the FBLBP feature.

3. The method according to claim 1, wherein in using the FBLBP feature and the GentleBoost algorithm to perform training, to obtain the first classifier, wherein the first classifier comprises the several optimal second classifiers, and each optimal second classifier is obtained by training using the GentleBoost algorithm, a calculation formula (1) of a second classifier is as follows:

$$f_m(x) = \begin{cases} a_0, & x = 0 \\ a_1, & x = 1 \\ \ldots \\ a_{2^K-1}, & x = 2^K - 1 \end{cases},$$

wherein $f_m(x)$ is the $m^{th}$ second classifier, x is a sketch value of an FBLBP feature of the second classifier, K is the number of neighbor blocks of the FBLBP feature, and $a_j$ is output of a second classifier, and wherein $a_j$ is calculated according to a formula (2):

$$a_j = \frac{\sum_i w_i y_i \delta(x_i = j)}{\sum_i w_i \delta(x_i = j)},$$

wherein $0 \leq j \leq 2^K - 1$ and j is an integer, $y_i$ is a class of the $i^{th}$ training image sample, wherein when the training image sample is a face image, a value of $y_i$ is 1, and when the training image sample is not a face image, the value of $y_i$ is −1, $\delta(\ )$ is a Kronecker function, wherein when $x_i = j$ is true, output is 1, and when $x_i = j$ is false, output is 0, i is the $i^{th}$ training image sample, and $\omega_i$ is weight of the $i^{th}$ training image sample.

4. The method according to claim 3, wherein the method further comprises obtaining, by calculation, the weight $\omega_i$ of the $i^{th}$ training image sample according to a formula (3) and a normalization formula (4), wherein the formula (3) is $\omega_i = \omega_i \times e^{-y_i f_m(x_r)}$, and the formula (4) is $$\omega_i = \frac{\omega_i}{\sum_i \omega_i}.$$

5. The method according to claim 3, wherein the method further comprises obtaining, by calculation, a sketch value x of an FBLBP feature of each second classifier according to a formula (5), wherein the formula (5) is as follows:

$$x = \sum_{k=1}^{K} 2^{k-1} FBLBP_{sign,k},$$

where K is the number of neighbor blocks;
if sign=1, $FBLBP_{sign,k}=\delta((AvgInt_{pivotblock}-AvgInt_{neighborblock_k})\le\theta_1)$; and
if sign=−1, $FBLBP_{sign,k}=\delta((AvgInt_{pivotblock}-AvgInt_{neighborblock_k})\le\theta_0)$;
wherein δ( ) is a Kronecker function, wherein when input is true, output is 1, and when input is false, output is 0.

6. The method according to claim 1, wherein in using the FBLBP feature and the GentleBoost algorithm to perform training to obtain the first classifier, wherein the first classifier comprises the several optimal second classifiers, a process of calculating the optimal second classifiers comprises the following substeps:
initially, the FBLBP feature comprises only one pivot block and one neighbor block, wherein an FBLBP feature set of the FBLBP feature that consists of the two rectangular blocks may be obtained using Brute force and traversal, for each FBLBP feature in the FBLBP feature set, calculating a sketch value of the FBLBP feature and an output value of a corresponding second classifier, substituting the obtained output value of the second classifier into a formula (6) to obtain an error J of the second classifier, and selecting a second classifier having a smallest value of the error J as the optimal second classifier, wherein the formula (6) is as follows:

$$J = \sum_{i=1}^{N} w_i(y_i - f_m(x_i))^2;$$

wherein J is an optimized objective function, that is, a weighted classification error, and N is the total number of training image samples; and
after the FBLBP feature that comprises only one pivot block and one neighbor block is determined, increasing the number of neighbor blocks for the FBLBP feature by traversing rectangular blocks, in an image, that have a same size as the pivot block, calculating a value x by substituting the sketch value of the FBLBP feature into a formula (5), calculating the error J by substituting the value x into the formula (6), when J further decreases, incorporating a new neighbor block into a current optimal second classifier, when J does not decrease, stopping incorporation, directly outputting the current feature, and meanwhile updating weight and entering a next GentleBoost cycle,
wherein a calculation formula (7) for combining an optimal second classifier of each GentleBoost cycle into the first classifier is as follows:

$$F(x)=F(x)+f_m(x),$$

wherein F(x) is the first classifier, and F(x) is initialized to 0.

7. The method according to claim 6, further comprising: determining a threshold of the first classifier according to a formula (8), wherein the formula (8) is as follows:

$$th = \text{argmax}\left(\sum_{i_1 \in Face} \delta(F(x_{i_1}) \ge th) + \sum_{i_2 \in Non\text{-}face} \delta(F(x_{i_2}) < th)\right).$$

wherein $i_1$ is the $i_1^{th}$ training image sample that comprises a face, $i_2$ is the $i_2^{th}$ training image sample that comprises a non-face, and th is the threshold of the first classifier.

8. The method according to claim 2, wherein for each of the neighbor blocks, calculating the differential result according to the sign bit, comparing and quantizing the differential result and the threshold, converting the binary number that consists of the quantization result of each of the neighbor blocks into the decimal number, and saving the decimal number to obtain the sketch value of the FBLBP feature comprises, for each neighbor block, when the sign bit is 1 and a difference between the sketch value $AvgInt_{pivotblock}$ of the pivot block and a sketch value $AvgInt_{neighborblock_k}$ of the $k^{th}$ neighbor block is not less than the threshold $\theta_1$, labeling a position of the neighbor block as 1, and otherwise, when the difference between the sketch value $AvgInt_{pivotblock}$ of the pivot block and the sketch value $AvgInt_{neighborblock_k}$ of the $k^{th}$ neighbor block is less than the threshold $\theta_1$, labeling the position of the neighbor block as 0, or for each of the neighbor blocks, when an opposite number of a difference between the sketch value $AvgInt_{pivotblock}$ of the pivot block and a sketch value $AvgInt_{neighborblock_k}$ of the $k^{th}$ neighbor block is not less than the threshold $\theta_0$, labeling a position of the neighbor block as 1, and otherwise, when the opposite number of the difference between the sketch value $AvgInt_{pivotblock}$ of the pivot block and the sketch value $AvgInt_{neighborblock_k}$ of the $k^{th}$ neighbor block is less than the threshold $\theta_0$, labeling the position of the neighbor block as 0.

9. A face detector training apparatus, comprising:
a memory comprising instructions; and
a processor coupled to the memory, wherein the instructions cause the processor to be configured to:
collect face and non-face images as a training image sample set;
extract a flexible block based local binary pattern (FBLBP) feature of the face and non-face images to form an FBLBP feature set;
perform training, using the FBLBP feature and using a GentleBoost algorithm, to obtain a first classifier, wherein the first classifier comprises several optimal second classifiers, and wherein each optimal second classifier is obtained by training using the GentleBoost algorithm;
repeat a training process to obtain multiple layers of first classifiers; and
cascade the multiple layers of first classifiers to form a face detector.

10. The apparatus according to claim 9, wherein the instructions further cause the processor to be configured to:
construct the FBLBP feature to represent co-occurrence information of a relative change of local grayscale of an image, wherein the FBLBP feature comprises several congruent rectangular blocks, a threshold, and a sign bit, wherein the several congruent rectangular blocks comprise one pivot block and at least one neighbor block, and when the sign bit is −1, the threshold is $\theta_0$, and when the sign bit is 1, the threshold is $\theta_1$, wherein $\theta_0$ and $\theta_1$ are real numbers;
calculate a sketch value $AvgInt_{pivotblock}$ of the pivot block in the FBLBP feature that is-a sketch value $AvgInt_{neighborblock_k}$ of each of the neighbor block in the FBLBP feature, wherein the sketch value $AvgInt_{pivotblock}$ of the pivot block is represented by average grayscale of an area in which the pivot block is located, the sketch value $AvgInt_{neighborblock_k}$ of each of the neighbor blocks is represented by average grayscale of an area in which each of the neighbor blocks is located separately, and k is a sequence number of the $k^{th}$ neighbor block, for each of the neighbor blocks;

calculate a differential result according to the sign bit;
compare and quantize the differential result and the threshold;
convert a binary number that consists of a quantization result of each of the neighbor blocks into a decimal number; and
save the decimal number to obtain a sketch value of the FBLBP feature.

11. The apparatus according to claim 9, wherein the instructions further cause the processor to be configured to use the FBLBP feature and the GentleBoost algorithm to perform training to obtain the first classifier, wherein the first classifier comprises several optimal second classifiers, and each optimal second classifier is obtained by training using the GentleBoost algorithm, wherein a calculation formula (1) of a second classifier is as follows:

$$f_m(x) = \begin{cases} a_0, & x = 0 \\ a_1, & x = 1 \\ \ldots \\ a_{2^K-1}, & x = 2^K - 1 \end{cases},$$

wherein $f_m(x)$ is the $m^{th}$ second classifier, x is a sketch value of an FBLBP feature of the second classifier, K is the number of neighbor blocks of the FBLBP feature, and $a_j$ is output of a second classifier, wherein $a_j$ is calculated according to a formula (2):

$$a_j = \frac{\sum_i w_i y_i \delta(x_i = j)}{\sum_i w_i \delta(x_i = j)},$$

wherein $0 \leq j \leq 2^K - 1$ and j is an integer; $y_i$ is a class of the $i^{th}$ training image sample, wherein when the training image sample is a face image, a value of $y_i$ is 1, and when the training image sample is not a face image, the value of $y_i$ is $-1$, $\delta(\ )$ is a Kronecker function, wherein when $x_i = j$ is true, output is 1, and when $x_i = j$ is false, output is 0, i is the $i^{th}$ training image sample, and $\omega_i$ is weight of the $i^{th}$ training image sample.

12. The apparatus according to claim 11, wherein the instructions further cause the processor to be configured to obtain, by calculation, the weight $\omega_i$ of the $i^{th}$ training image sample according to a formula (3) and a normalization formula (4), wherein the formula (3) is $\omega_i = \omega_i \times e^{-y_i f_m(x_i)}$, and the formula (4) is $$\omega_i = \frac{\omega_i}{\sum_i \omega_i}.$$

13. The apparatus according to claim 11, wherein the instructions further cause the processor to be configured to obtain, by calculation, a sketch value x of an FBLBP feature of each second classifier in the formula (1) according to a formula (5), wherein the formula (5) is as follows:

$$x = \sum_{k=1}^{K} 2^{k-1} FBLBP_{sign,k},$$

where K is the number of neighbor blocks;
when sign=1, $FBLBP_{sign,k} = \delta((AvgInt_{pivotblock} - AvgInt_{neighborblock_k}) \leq \theta_1)$; and
when sign=−1, $FBLBP_{sign,k} = \delta((AvgInt_{pivotblock} - AvgInt_{neighborblock_k}) \leq \theta_0)$;
wherein $\delta(\ )$ is a Kronecker function, wherein when input is true, output is 1, otherwise, when input is false, output is 0.

14. The apparatus according to claim 9, wherein the FBLBP feature comprises only one pivot block and one neighbor block, wherein an FBLBP feature set of the FBLBP feature that consists of the two rectangular blocks may be obtained using Brute force and traversal, for each FBLBP feature in the FBLBP feature set, wherein the first classifier is configured to:
calculate a sketch value of the FBLBP feature and an output value of a corresponding second classifier;
substitute the obtained output value of the second classifier into a formula (6) to obtain an error J of the second classifier;
select a second classifier having a smallest value of the error J as the optimal second classifier, wherein the formula (6) is as follows:

$$J = \sum_{i=1}^{N} w_i (y_i - f_m(x_i))^2,$$

wherein J is an optimized objective function, that is, a weighted classification error, and N is the total number of training image samples;
increase, after determining that the FBLBP feature comprises only one pivot block and one neighbor block, the number of neighbor blocks for the FBLBP feature by traversing rectangular blocks, which have a same size as the pivot block, in an image;
re-calculate a value x by substituting the sketch value of the FBLBP feature into a formula (5);
calculate the error J by substituting the value x into the formula (6), when J further decreases, incorporate a new neighbor block into a current optimal second classifier, when J does not decrease, stop incorporation, directly output the current feature, and meanwhile update weight and enter a next GentleBoost cycle; and
combine an optimal second classifier that is obtained in each cycle into the first classifier according to a formula (7), wherein the formula (7) is as follows:

$$F(x) = F(x) + f_m(x),$$

wherein F(x) is the first classifier, and F(x) is initialized to 0.

15. The apparatus according to claim 14, wherein the instructions further cause the processor to be configured to determine a threshold of the first classifier according to a formula (8), wherein the formula (8) is as follows:

$$th = \operatorname{argmax}\left( \sum_{i_1 \in Face} \delta(F(x_{i_1}) \geq th) + \sum_{i_2 \in Non\text{-}face} \delta(F(x_{i_2}) < th) \right),$$

wherein $i_1$ is the $i_1^{th}$ training image sample that comprises a face, $i_2$ is the $i_2^{th}$ training image sample that comprises a non-face, and th is the threshold of the first classifier.

16. The apparatus according to claim 10, wherein the instructions further cause the processor to be configured to, for each neighbor block, when the sign bit is 1 and a difference between the sketch value $AvgInt_{pivotblock}$ of the pivot block and a sketch value $AvgInt_{neighborblock_k}$ of the $k^{th}$ neighbor block is not less than the threshold $\theta_1$, label a position of the neighbor block as 1, and otherwise, when the difference between the sketch value $AvgInt_{pivotblock}$ of the pivot block and the sketch value $AvgInt_{neighborblock_k}$ of the $k^{th}$ neighbor block is less than the threshold $\theta_1$, label the position of the neighbor block as 0, or for each of the neighbor blocks, when an opposite number of a difference between the sketch value $AvgInt_{pivotblock}$ of the pivot block and a sketch value $AvgInt_{neighborblock_k}$ of the $k^{th}$ neighbor block is not less than the threshold $\theta_0$, label a position of the neighbor block as 1, and otherwise, when the opposite number of the difference between the sketch value $AvgInt_{pivotblock}$ of the pivot block and the sketch value $AvgInt_{neighborblock_k}$ of the $k^{th}$ neighbor block is less than the threshold $\theta_0$, label the position of the neighbor block as 0.

* * * * *